UNITED STATES PATENT OFFICE.

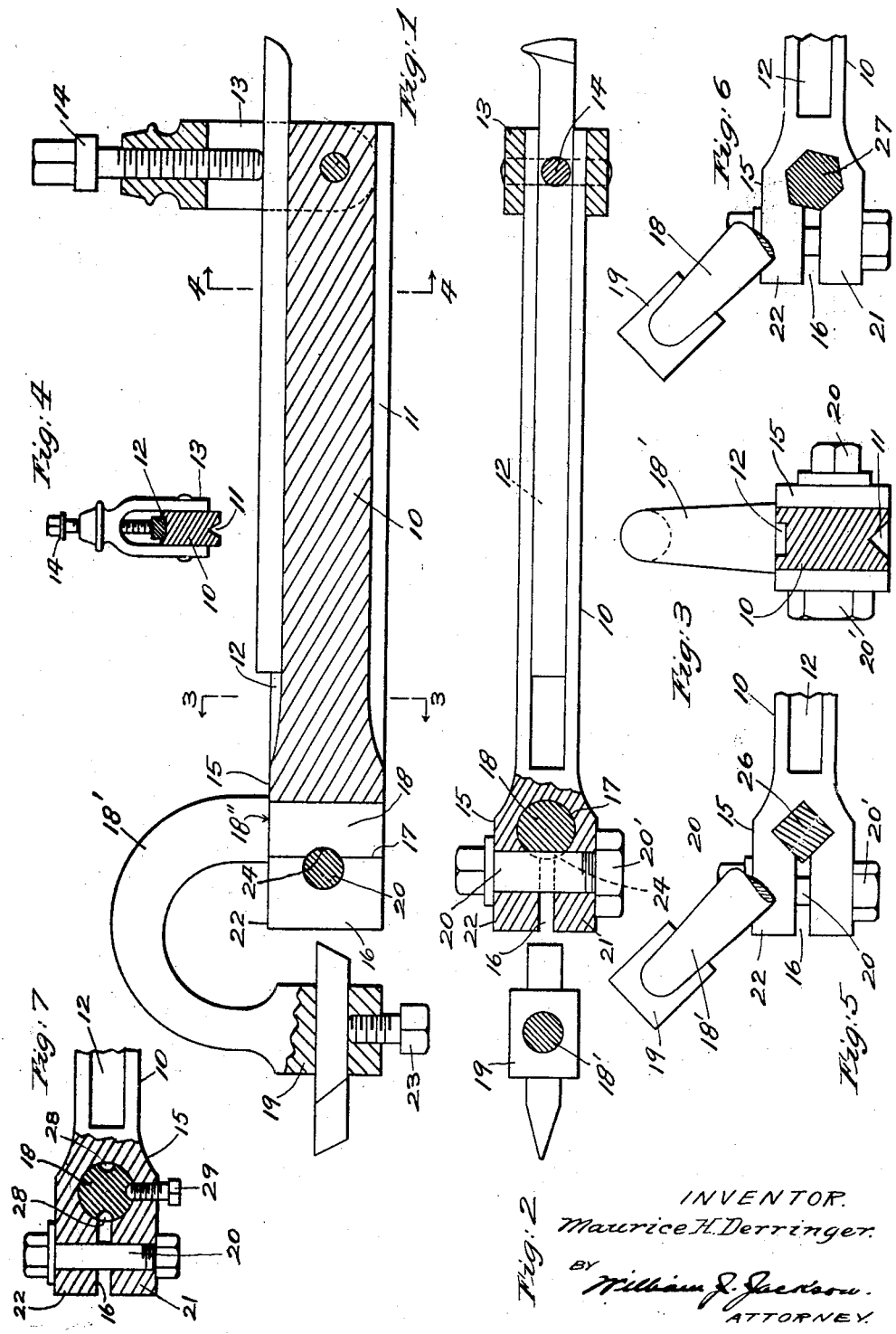

MAURICE H. DERRINGER, OF PHILADELPHIA, PENNSYLVANIA.

TOOL-HOLDER.

1,381,457. Specification of Letters Patent. Patented June 14, 1921.

Application filed May 1, 1920. Serial No. 378,257.

*To all whom it may concern:*

Be it known that I, MAURICE H. DERRINGER, a citizen of the United States, residing at the city of Philadelphia, county of Philadelphia, and State of Pennsylvania, have invented a certain new and useful Improved Tool-Holder, of which the following is a specification.

The invention has for its object to provide a tool-holder designed for machinists' use which is of simple and comparatively inexpensive construction and which is efficient for use in connection with lathes, planing and milling machines. Another object is to provide a tool-holder which may be successfully employed in connection with tools for turning, forming and boring and for internal and external screw-cutting or threading. A further object is to provide a tool-holder in which tools, too small to be supported in a lathe-post, may be successfully employed. A still further object is to provide a tool-holder the shank of which is adapted to carry in a resilient or yielding fashion a tool which may be positioned parallel with such shank or tangently thereto and which is interlocked to prevent withdrawal from said shank. Other and further objects will hereinafter appear.

The invention consists of the improvements hereinafter described and finally claimed.

The nature, characteristic features and scope of the invention will be more fully understood from the following description taken in connection with the accompanying drawings forming part hereof, and in which:

Figure 1, is a view in side elevation of a tool-holder embodying features of the invention.

Fig. 2, is a top or plan view of Fig. 1, partly sectioned.

Fig. 3, is a view in cross-section taken upon the line 3—3 of Fig. 1.

Fig. 4, is a similar view taken upon the line 4—4 of Fig. 1.

Figs. 5 and 6 are fragmentary views illustrating modified forms of construction, and Fig. 7, is a similar view of a further modified form.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10 designates a shank in the form of a rectangular bar provided upon opposite faces with grooves of which one is V-shaped and the other U-shaped, the former being designated 11 and the latter 12. Those grooves do not extend from end to end of the shank but terminate short of one end thereof for a purpose to presently appear. Pivoted to that end of the shank opposite the un-grooved end is a yoke 13. The yoke may be swung around its pivot point so as to overlie groove 11 or groove 12 as desired. The yoke 13 is provided with a screw 14 for engaging the shank of a tool as fitted to groove 11 or groove 12. Such tool may have a rectangular shank or a cylindrical shank. The former may be accommodated by groove 12 and the latter by groove 11. The un-grooved end of shank 10, considered in plan, is broadened out as at 15, is slotted as at 16 and is provided with a vertical disposed socket 17 which is in communication with said slot. Detachably engaging said socket is the stem 18 of a member 18' of gooseneck-like configuration the free end of which carries a tool support 19. That portion of member 18' adjacent stem 18 is of greater cross section than is the part to which is attached the support 19. In practice the gooseneck-like member gradually tapers toward the support 19 and a shoulder 18" is present for resting upon part 15 of shank 10. A threaded bolt 20 and nut 20' are employed for drawing together the parts 21 and 22 formed by slot 16 so as to clamp the stem 18 rigidly to place. The support 19 is provided with a screw 23 for clamping a suitable tool to place. Such a gooseneck structure provides a yielding tool support of spring-like characteristics. In other words in the cutting of screw-threads for instance, where accuracy is required, any slight irregularities will cause yielding of the tool support in a direction toward the slotted end of the shank 10 instead of binding or jamming. In order to prevent rotation of the stem 18 around its vertical axis and to prevent withdrawal said stem is grooved as at 24 and bolt 20 is caused to engage with said groove thus interlocking the parts. Instead of having the stem 18 and socket 17 cylindrical the same may be of rectangular or hexagonal configuration as shown at 26 and 27 in Figs. 5 and 6 respectively. When so constructed rotation around the vertical axes thereof is precluded and the stems may be so positioned with respect to a socket that the tool supports are disposed tangently with respect to the shank 10 which is often an advantageous feature. In Fig. 7, the stem 18 is shown as being provided with a plurality of notches 28 and a screw 29 is adapted to engage with such notched portions of the stem according to the position of stem 18 as moved around its axis. Thus the tool support 19 may be positioned in alinement with said shank as well as tangently thereto. The engagement of screw 29 with a notch 28 serves to prevent withdrawal of stem 18 as well as prevent rotation thereof around its axis. Bolt 20 serves to securely clamp parts together.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

What I claim is:—

1. A tool holder comprising a shank, slotted in a plane parallel with the longitudinal axis of said shank, and having a socket passing through said shank, at right angles to the longitudinal axis of the shank and to the rear of and in communication with said slot, a gooseneck fitted to said socket, said gooseneck forming a tool support and a bolt passing through said shank in advance of said socket for clamping the gooseneck with respect to said shank.

2. In a tool holder, a shank slotted in a plane parallel with the longitudinal axis of said shank and having a socket passing through said shank at right angles to the longitudinal axis of the shank and to the rear of and communicating with said slot.

3. A tool holder comprising a shank slotted in a plane parallel with the longitudinal axis of said shank and having a socket passing through said shank at right angles to the longitudinal axis of the shank and to the rear of and communicating with said slot, a tool support fitted to said socket and means for clamping said tool support with respect to said shank.

In testimony whereof I have hereunto signed my name.

MAURICE H. DERRINGER.